United States Patent Office 3,779,990
Patented Dec. 18, 1973

---

3,779,990
PROCESS FOR THE PRODUCTION OF SHAPEABLE POLYMERS CONTAINING COO-SILYL GROUPS
Gerd Greber, Binningen, and Roland Darms, Therwil, Switzerland, assignors to Ciba-Geigy Corporation, Ardsley, N.Y.
No Drawing. Filed Feb. 14, 1972, Ser. No. 226,262
Claims priority, application Switzerland, Feb. 26, 1971, 2,902/71
Int. Cl. C08g 20/32
U.S. Cl. 260—47 CP          6 Claims

ABSTRACT OF THE DISCLOSURE

The invention relates to a process for the production of shapeable polymers containing COO-silyl groups, especially polyamide-imides and polyimides containing COO-silyl groups, said process comprising treating polyamide acids with suitable silylating agents, as well as the novel polymers obtained by said process and their use for the production of shaped structures such as films, fibres, coatings, adhesives and the like. The polymers prepared according to the invention are distinguished by an inherent viscosity of from 0.1 to 4.0 and their improved solubility in organic solvents which facilitates the processing of said polymers.

---

The present invention relates to a process for the manufacture of polymers, containing COO-silyl groups, which can be shaped, the new products obtainable by the process, and their use for the manufacture of industrial products such as films, fibres, fibre-reinforced composite materials, laminates, ply materials, adhesives and foams, coating compositions or paper, and the products obtained from these.

U.S. patent specification 3,303,157 has disclosed a process for the manufacture of COO-silylated polyamide acids, in which a tetracarboxylic acid dianhydride is reacted with an N,N'-disilylated diaminoaryl compound. However, only relatively short-chain silylated polyamide-acids, having an inherent viscosity of up to approx. 0.3, can be manufactured by this process. Furthermore, the process is restricted to the use of particular silylated diamines.

It has now been found that the disadvantages mentioned are avoided and that polymers containing COO-silyl group, and which are soluble in organic solvents, above all in mixtures of chlorinated lower aliphatic hydrocarbons, especially methylene chloride, cycloaliphatic ketones, such as cyclohexanone, or cyclic ethers, especially tetrahydrofurane, with N,N-dialkylamides of lower monocarboxylic acids, such as dimethylformamide and dimethylacetamide, dialkylsulphoxides, such as dimethylsulphoxide or cyclic amides, such as N-methylpyrrolidone, which can be shaped and which have an inherent viscosity of 0.1 to 4.0, above all 0.5 to 4.0, and very particularly 0.9 to 2.5, and which possess identical or different recurring structural units of the General Formula I

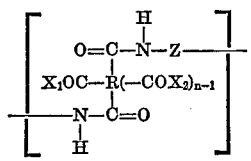
(I)

in which R represents a radical which possesses at least one 5-membered or 6-membered cycloaliphatic, carbocyclicaromatic or heterocyclic ring, with the carbonyl groups being directly bonded to different ring carbon atoms, $X_1$ and $X_2$ represent a radical of the formula

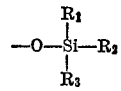

or hydroxyl, with $R_1$, $R_2$ and $R_3$ independently of one another each denoting an optionally substituted alkyl radical with 1 to 12 carbon atoms or an optionally substituted cycloalkyl, aryl, aralkyl, lower alkoxy or aryloxy radical and the radicals $-COX_1$ and $COX_2$ are each located on a ring carbon atom adjacent to the carbonamide group, $n$ denotes the number 1 or 2 and 2 denotes a divalent carbocyclic-aromatic or heterocyclic-aromatic radical, an aliphatic radical with at least 2 carbon atoms, a cycloaliphatical radical or an araliphatic radical, or derivatives of these polymers which are partially cyclised to the corresponding imide, with at least one structural unit of the general Formula I containing a

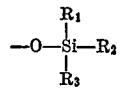

group, are obtained if a polyamide-acid with identical or different recurring structural units of the General Formula II

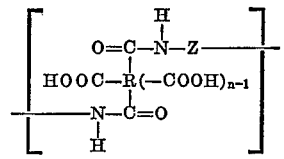
(II)

in which what has been stated under Formula I applies to R, Z and $n$ and the COOH radicals are each located on a ring carbon atom adjacent to the carbonamide group, or derivatives thereof which are partially cyclised to the corresponding imide, are reacted with a silylating agent which introduces a radical of the formula

int the carboxyl groups, $R_1$, $R_2$ and $R_3$ having the meaning indicated under Formula I.

The polymers containing COO-silyl groups manufactured according to the invention are physically characterised by the inherent viscosity $\eta_{inh.}$, which is calculated in accordance with the following equation:

$$\eta_{inh.} = \frac{\ln \frac{\eta}{\eta_o}}{c}$$

In this equation the symbols denote the following:
ln=natural logarithm,
$\eta$=viscosity of the solution (0.5% by weight of the polymer in a suitable solvent, for example N,N-dimethylacetamide, N,N-dimethylformamide or N-methylpyrrolidone),
$\eta_o$=viscosity of the solvent and
$c$=concentration of the polymer solution in g of polymer per 100 ml. of solvent.

The viscosities are measured at 25° C. As is generally known, the inherent viscosity is a measure of the molecular weight of a polymer.

The process according to the invention also permits the manufacture of new long-chain polymers, not obtainable by the previously known process, which contain COO-silyl groups in accordance with the definition and have an inherent viscosity of 0.5 to 4.0, especially 0.9 to 2.5, and possess identical or different recurring structural units of the General Formula I, or derivatives thereof which are partially cyclised to the corresponding imide.

The polyamide-acids of the Formula II which can be used in the process according to the invention are in themselves known or can be manufactured in a known manner.

In the Formulae I and II R, when denoting a carbocyclic-aromatic radical, especially represents a monocyclic radical, a condensed polycyclic radical or a polycyclic radical with several cyclic, condensed or non-condensed systems which can be bonded to one another directly or via bridge members.

As examples of suitable bridge members there may be mentioned:

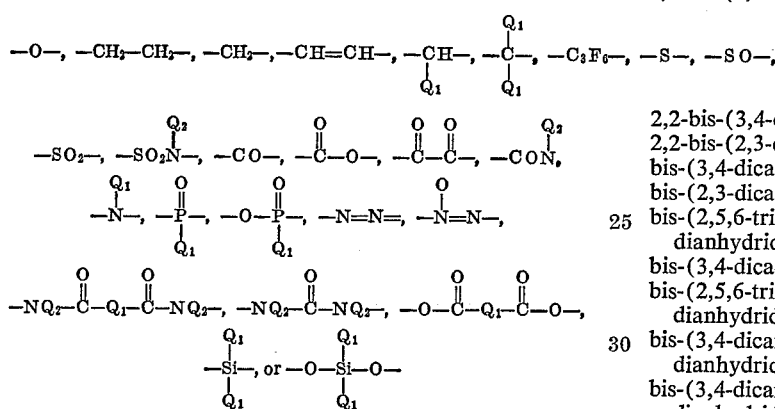

wherein $Q_1$ represents an alkyl radical with 1 to 6, preferably 1 to 4, carbon atoms, which can optionally be substituted by halogen atoms, preferably fluorine, a cycloalkyl or an aryl radical and $Q_2$ represents hydrogen, an alkyl radical with 1 to 4 carbon atoms which can optionally be substituted by halogen atoms, a cycloalkyl or an aryl radical.

Such radicals can also be bonded to one another via two bridge members, such as two —$SO_2$— groups.

If R in the Formulae I and II represents a heterocyclic radical, heterocyclic-aromatic, optionally benzo-condensed ring systems containing O, N and/or S can in particular be involved.

Cycloaliphatic, carbocyclic-aromatic or heterocyclic radicals represented by R can also be substituted, for example by nitro groups, lower alkyl groups, trifluoromethyl groups, halogen atoms, especially fluorine, sulphamoyl, N-lower alkyl-, N,N-di-lower alkyl- or N-phenyl-amino groups, as well as silyl groups.

If $n$ represents the number 2, R in the above formulae probably denotes the benzene ring or the benzophenone ring system and Z denotes a benzene ring, a 4,4'-diphenyl-sulphone or 4,4'-diphenyl radical and especially 4,4'-diphenyl-ether radical, whilst $X_1$ and $X_2$ have the indicated meaning, but preferably represent hydroxyl or a radical of the formula

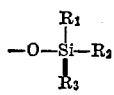

wherein $R_1$, $R_2$ and $R_3$ independently of one another each denote an unsubstituted lower alkyl radical.

According to a further preference, R represents the benzene ring if $n$ denotes the number 1, whilst Z, $X_1$, $R_1$, $R_2$ and $R_3$ have the abovementioned preferred meaning.

Trimellitic anhydride and 4-chloroformyl-phthalic anhydride can in particular be used for the manufacture of polyamide-acids of the Formula II in which $n$ denotes the number 1. Tetracarboxylic acid derivatives, preferably in the form of their anhydrides, are employed for the manufacture of polyamide-acids of the Formula II in which $n$ denotes the number 2.

As examples of suitable tetracarboxylic acid dianhydrides of this nature there may be mentioned:

pyromellitic acid dianhydride,
3,3',4,4'-benzophenone-tetracarboxylic acid dianhydride,
2,3,3',4'-benzophenone-tetracarboxylic acid dianhydride,
2,2',3,3'-benzophenone-tetracarboxylic acid dianhydride,
4,4',5,5',6,6'-hexafluorobenzophenone-2,2',3,3'-tetracarboxylic acid dianhydride,
3,3',4,4'-diphenyl-tetracarboxylic acid dianhydride,
2,2',3,3'-diphenyl-tetracarboxylic acid dianhydride,
bis-(2,3-dicarboxyphenyl)-methane dianhydride,
bis-(3,4-dicarboxyphenyl)-methane dianhydride,
bis-(2,5,6-trifluoro-3,4-dicarboxyphenyl)-methane dianhydride,
1,1-bis-(3,4-dicarboxyphenyl)-ethane dianhydride,
2,2-bis-(3,4-dicarboxyphenyl)-propane dianhydride,
2,2-bis-(2,3-dicarboxyphenyl)-propane dianhydride,
bis-(3,4-dicarboxyphenyl)-ether dianhydride,
bis-(2,3-dicarboxyphenyl)-ether dianhydride,
bis-(2,5,6-trifluoro-3,4-dicarboxyphenyl)-ether dianhydride,
bis-(3,4-dicarboxyphenyl)-sulphone dianhydride,
bis-(2,5,6-trifluoro-3,4-dicarboxyphenyl)-sulphone dianhydride,
bis-(3,4-dicarboxyphenyl)-phenylphosphonate dianhydride,
bis-(3,4-dicarboxyphenyl)-phenylphosphine oxide dianhydride,
N,N-(3,4-dicarboxyphenyl)-N-methylamine dianhydride,
bis-(3,4-dicarboxyphenyl)-diethylsilane dianhydride,
bis-(3,4-dicarboxyphenyl)-tetramethyl-disiloxane dianhydride,
3,3',4,4'-tetracarboxybenzoyloxybenzene dianhydride,
1,4,5,8-naphthalene-tetracarboxylic acid dianhydride,
2,3,6,7-naphthalene-tetracarboxylic acid dianhydride,
1,2,5,6-naphthalene-tetracarboxylic acid dianhydride,
2,6-dichloronaphthalene-1,4,5,8-tetracarboxylic acid dianhydride,
2,7-dichloronaphthalene-1,4,5,8-tetracarboxylic acid dianhydride,
2,3,6,7-tetrachloronaphthalene-1,4,5,8-tetracarboxylic acid dianhydride,
1,4,5,8-tetrafluoronaphthalene-2,3,6,7-tetracarboxylic acid dianhydride,
phenanthrene-1,8,9,10-tetracarboxylic acid dianhydride,
3,4,9,10-perylene-tetracarboxylic acid dianhydride,
thiophene-2,3,4,5-tetracarboxylic acid dianhydride,
pyrazine-2,3,5,6-tetracarboxylic acid dianhydride,
pyridine-2,3,5,6-tetracarboxylic acid dianhydride,
tetrahydrofurane-2,3,4,5-tetracarboxylic acid dianhydride,
3,3',4,4'-azobenzene-tetracarboxylic acid dianhydride,
3,3',4,4'-azoxybenzene-tetracarboxylic acid dianhydride,
1,2,3,4-cyclopentanetetracarboxylic acid dianhydride as well as dianhydrides of the general formula

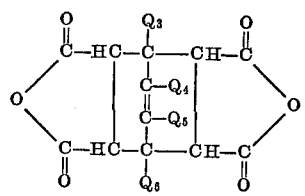

in which $Q_3$, $Q_4$, $Q_5$ and $Q_6$ independently of one another denote hydrogen, halogen, alkyl, cycloalkyl, phenyl, aralkyl, acyl or an optionally esterified or etherified hydroxy group, for example bicyclo[2,2,2]oct-7-ene-2,3,5,6-tetracarboxylic acid dianhydride.

Instead of the abovementioned anhydrides, the free carboxylic acids or the corresponding acid chlorides or esters can also be employed in the process according to the invention. Pyromellitic acid dianhydride and benzophenonetetracarboxylic acid dianhydrides are preferred.

To manufacture the polyamide-acids of the Formula II, the optionally substituted carbocyclic-aromatic, heterocyclic-aromatic, aliphatic, cycloaliphatic or araliphatic diamines of the general formula $H_2N-Z-NH_2$, which are known from the literature, can be used.

Possible carbocyclic-aromatic diamines of the general formula $H_2N-Z-NH_2$ are compounds in which Z represents one or more carbocyclic-aromatic radicals bonded to one another directly or via bridge members, these radicals being optionally substituted further, for example by alkyl or alkoxy groups with 1–4 carbon atoms, or by halogen atoms, especially fluorine. Possible bridge members are the groups mentioned above when discussing R. As specific examples of carbocyclic-aromatic diamines there may be mentioned: o-, m- and p-phenylene-diamine, diaminotoluenes, such as 2,4-diaminotoluene,
1,4-diamino-2-methoxybenzene,
2,5-diaminoxylene,
1,4-diamino-2,5-dichlorobenzene,
1,4-diamino-2-bromobenzene,
4-isopropyl-m-phenylenediamine,
2,4'- or 4,4'-diaminodiphenyl,
3,3'-dimethyl-4,4'-diaminodiphenyl,
3,3'-dimethoxy-4,4'-diaminodiphenyl,
3,3'-diamino-2,2',4,4'-5,5'-6,6'-octafluorodiphenyl,
4,4'-diamino-2,2',3,3',5,5'-6,6'-octafluorodiphenyl,
3,3'-dichloro-4,4'-diaminodiphenyl,
4,4-diaminodiphenyl-2,2-propane,
4,4'-diamino-diphenylmethane,
2,2'- or 4,4'-diaminostilbene,
4,4'-diamino-2,2',3,3',5,5',6,6'-octafluorodiphenylmethane,
4,4'-diaminodiphenyl-ether,
4,4'-diamino-2,2',3,3',5,5',6,6'-octafluorodiphenyl-ether,
4,4'-diaminodiphenylthioether,
4,4'-diaminodiphenylsulphone,
3,3'-diaminodiphenylsulphone,
4,4'-diaminobenzoic acid phenyl ester,
2,2',- or 4,4'-diaminobenzophenone,
4,4'-diaminobenzil,
4-(4'-aminophenylcarbamoyl)-aniline,
bis-(4-aminophenyl)-phosphine oxide,
bis-(4-aminophenyl)-methylphosphine oxide,
bis-(3-aminophenyl)-methylphosphine oxide,
bis-(4-aminophenyl)-phenylphosphine oxide,
bis-(4-aminophenyl)-cyclohexylphosphine oxide,
N,N-bis 4-amino-phenyl-N-phenylamine,
N,N-bis-4-aminophenyl-N-methylamine,
4,4'-diaminodiphenylamine,
para-bis-(2-methyl-4-aminophenyl)-benzene,
2,2'- 3,3'- or 4,4'-diaminoazobenzene,
4,4'-diaminodiphenylurea,
1,8- or 1,5-diaminonaphthalene,
1,5-diaminoanthraquinone,
diamino-fluoroanthene,
3,9-diaminochrysene,
diamino-pyrene,
bis-(4-aminophenyl)-diethylsilane,
bis-(4-aminophenyl)-dimethylsilane and bis-(4-aminophenyl)-tetramethyldisiloxane.

o-, m- and p-phenylenediamines, 4,4'-diaminodiphenyl, 4,4'-diaminodiphenylsulphone and especially 4,4'-diaminodiphenylether, which are optionally substituted by lower alkyl or alkoxy groups or halogen atoms, are particularly preferred.

As a further class of suitable diamines there may be mentioned the compounds of the general formula $$H_2N-Z-NH_2$$

described in French patent specification 1,539,074, in which Z represents a radical of the formula

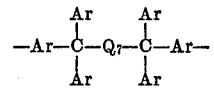

wherein Ar represents a carbocyclic-aromatic radical, especially the unsubstituted phenyl radical and $Q_7$ represents a radical with at least two carbocyclic-aromatic rings of which each is directly bonded to one of the C atoms indicated in the formula, especially a radical of the formula

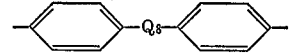

wherein $Q_8$ preferably has the meaning of

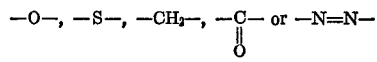

Possible aliphatic diamines are especially optionally substituted alkylenediamines. The alkylene chain of such diamines can also be interrupted by hetero-atoms, such as O, S or N atoms. Examples of such compounds are:

di-, tri-, tetra-, hexa-, hepta-, octa-, nona- and deca-methylenediamine,
2,2-dimethylpropylenediamine,
2,5-dimethylhexamethylenediamine,
2,5-dimethylheptamethylenediamine,
4,4-dimethylheptamethylenediamine,
3-methylheptamethylenediamine,
3-methoxyhexamethylenediamine,
5-methylnonamethylenediamine,
2,11-diaminododecane,
1,12-diaminooctadecane and
1,2-bis-(3-aminopropoxy)-ethane as well as the diamines of the formulae $$H_2N(CH_2)_3O(CH_2)_2O(CH_2)_3NH_2,$$
$$H_2N(CH_2)_3S(CH_2)_3NH_2 \text{ and}$$
$$H_2N(CH_2)_3N(CH_3)(CH_2)_3NH_2.$$

Finally, 1,4-diaminocyclohexane and 4,4' - diaminodicyclohexylmethane may be mentioned as suitable cycloaliphatic diamines and 1,4-bis-(2-methyl-4-aminopentyl)-benzene, 1,4-bis-(1,1-dimethyl - 5 - aminopentyl)-benzene, 1,3- or 1,4-bis-(aminomethyl) - benzene, 2,4-bis-[(2'-amino-1', 1'-dimethyl) - ethyl] - toluene and bis-[4-(2'-amino - 1',1' - dimethyl)-ethylphenyl]-ether may be mentioned as suitable araliphatic diamines.

Possible heterocyclic-aromatic diamines are the known 5-membered or 6-membered compounds containing O, N and/or S, for example 2,6-diaminopyridine, 2,4-diaminopyrimidine, 3,6-diaminoacridine, 2,4-diamino - s - triazine, 2,7-diamino-dibenzofurane, 2,7-diaminocarbazole, 3,7-diamino-phenothiazine, 5,6-diamino-1,3-dimethyl-uracil and 2,5-diamino-1,3,4-thiadiazole.

As agents which introduce radicals

into the carboxyl groups it is possible to use, in the process according to the invention, any desired silylating agents which are in themselves known or can be manufactured in a manner which is in itself known, especially compounds of the following classes:

(1) Amides of the General Formulae IIIa or IIIb

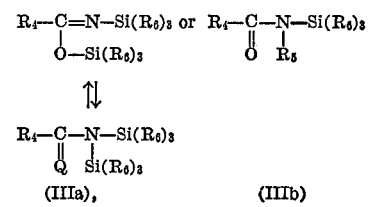

in which $R_4$ denotes hydrogen, the trifluoromethyl radical, or an optionally substituted lower alkyl, cycloalkyl, aryl or aralkyl radical, $R_5$ denotes hydrogen or an optionally substituted lower alkyl, cycloalkyl, aryl or aralkyl radical and $R_6$ each independently of one another denotes an optionally substituted lower alkyl, cycloalkyl, aryl or aralkyl radical.

As examples of suitable compounds of the Formulae IIIa or IIIb there may be mentioned:

bis-trimethylsilylacetamide,
bis-triethylsilylacetamide,
trimethylsilylacetamide,
N-methyl-N-trimethylsilylacetamide,
bis-trimethylsilylformamide,
bis-trimethylsilyltrifluoroacetamide,
bis-trimethylsilylbenzamide,
bis-trimethylsilyl-p-methoxy-benzamide and
bis-trimethylsilyltolylamide.

Apart from the abovementioned amides, bis-trimethylsilylacrylamide can also be used as a silylating agent in the process according to the invention.

(2) Amines of the General Formula IV

(IV)

in which $R_6'$ each independently of one another denotes an optionally substituted lower alkyl, cycloalkyl, aryl, aralkyl, lower alkoxy or phenoxy radical and $R_7$ and $R_8$ independently of one another denote hydrogen, an optionally substituted lower alkyl, cycloalkyl, aryl or aralkyl radical or a $(R_6)_3$—Si radical.

As examples of suitable compounds of the Formula IV there may be mentioned:

trimethylsilylamine,
N,N-diethyltrimethylsilylamine,
N,N-diethyl-trimethoxysilylamine,
N-ethyl-trimethylsilylamine,
N,N-diethyl-triphenylsilylamine,
N,N-diethyl-triphenoxysilylamine,
N-phenyl-triethylsilylamine,
N-cyclohexyl-trimethylsilylamine,
N,N-dibenzyl-trimethylsilylamine,
N,N-diethyl-dimethyl-ethyl-silylamine,
N,N-diphenyltrimethylsilylamine,
N-methyl-N-phenyl-trimethylsilylamine,
N-ethyl-N-phenyl-trimethylsilylamine,
N-methyl-N-cyclohexyltrimethylsilylamine,
hexamethyldisilazane and
N,N-bis-(trimethylsilyl)-aniline (3) Diamines of the General Formula V

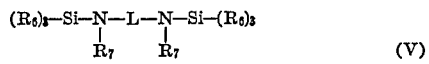

(V)

in which $R_6$ and $R_7$ have the meanings indicated under the Formulae IIIa and IIIb or IV, and L represents a phenylene radical or an alkylene radical with 2 to 10 carbon atoms.

Examples of such compounds are:

1,4-bis-(trimethylsilylamino)-benzene,
1,4-bis-(ditrimethylsilylamino)-benzene,
1,4-bis-(N-methyl-N-trimethylsilylamino)-benzene and
1,6-bis-(trimethylsilylamino)-hexane.

(4) Hydroxylamines of the General Formula VI

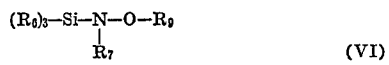

(VI)

in which $R_6$ and $R_7$ have the abovementioned meanings and $R_9$ represents an optionally substituted lower alkyl, cycloalkyl, aryl or aralkyl radical or a —Si$(R_6)_3$ radical.

As examples there may be mentioned: N-methyl-N-ethoxy-trimethylsilylamine, N - phenoxy-trimethylsilylamine and N - methyl-N-trimethylsiloxy-trimethylsilylamine.

(5) Compounds of the General Formula VII

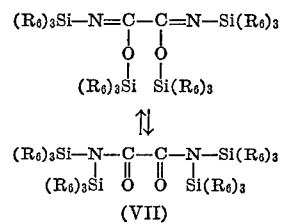

(VII)

in which $R_6$ has the meaning indicated under Formula IIIa or IIIb, such as tetrakis-(trimethylsilyl)-oxamide and tetrakis-(triethylsilyl)-oxamide.

(6) Compounds of the General Formula VIII

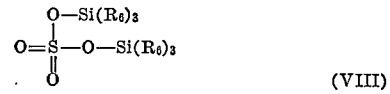

(VIII)

in which $R_6$ has the meaning indicated under Formula IIIa or IIIb, such as bis-(trimethylsilyl)-sulphate or bis-(triphenylsilyl)-sulphate.

By means of the silylating agents hitherto mentioned it is possible to silylate, in the polyamide-acids, not only carboxyl protons but in general also amide protons, whilst the compounds of the following classes are only suitable for the silylation of the carboxyl protons:

(a) Halides of the General Formula IX

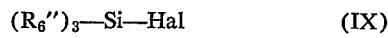 (IX)

in which $R_6''$ denotes an optionally substituted alkyl group with up to 12 carbon atoms or an optionally substituted cycloalkyl, aryl, aralkyl, lower alkoxy or aryloxy group and Hal denotes fluorine, chlorine or bromine.

As examples there may be mentioned:

trimethoxychlorosilane,
trimethylchlorosilane,
triphenylbromosilane,
methyldiethylbromosilane,
triphenylchlorosilane,
tritolylbromosilane,
triethylchlorosilane,
tribenzylchlorosilane,
tricyclohexylchlorosilane,
trioctylchlorosilane,
triphenoxychlorosilane,
tridodecylbromosilane and
dimethylnaphthylchlorosilane.

(b) Ureas of the General Formula X

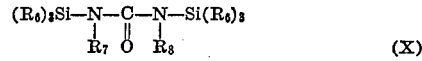

(X)

in which $R_6$, $R_7$ and $R_8$ have the abovementioned meanings, such as

N,N'-dimethyl-N,N'-ditrimethylsilylurea,
N,N'-diphenyl-N,N'-ditrimethylsilylurea,
N,N,N',N'-tetra-(trimethylsilyl)-urea and
N,N'-diphenyl-N-trimethylsilyl-urea.

(c) Imidazoles and 1,2,4-triazoles of the General Formula XI and XII

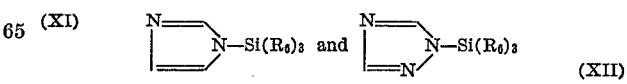

in which $R_6$ has the meaning indicated under Formula IIIa or IIIb, such as imidazolyl-1-trimethylsilane,
imidazolyl-1-triethylsilane,
imidazolyl-1-triphenylsilane,
1,2,4-triazolyl-1-trimethylsilane and
1,2,4-triazolyl-1-diethylmethylsilane.

(d) Lactams of the General Formula XIII

(XIII)

in which $R_6'$ has the meaning indicated under Formula IV and $R_{10}$ represents a bifunctional alkylene radical with 3–12 carbon atoms or an arylene radical, such as N-trimethylsilylpyrrolidone,
N-triphenylsilylpiperidone,
N-trimethoxysilyl-ε-caprolactam,
N-triethylsilyl-ε-caprolactam and
N-triethylsilyl-ε-caprolactam.

(e) Cyclic amines of the General Formula XIV

(XIV)

in which $R_6$ has the meaning indicated under Formula IIIa or IIIb and $R_{11}$ represents a bifunctional alkylene radical with 2–12 carbon atoms which optionally contains further hetero-atoms, such as O or S, or represents a fused arylene radical, for example N-trimethylsilylpyrrolidine, N-triphenylsilylpiperidine, N - methyldiethylsilylmorpholine, N-trimethylsilylmorpholine and N-trimethylsilyltetrahydro-1,4-thiazine.

Further, N-trimethylsilylacrylamide, N,N'-bis-trimethylsilylcarbodiimide and N,N'-bis-trimethylsilyl-2-imidazolidone can, for example, be employed as reagents which silylate carboxyl groups.

If sulphates of the Formula VIII or halides of the Formula IX are used for the silylation of carboxyl protons, acid-binding agents, such as tertiary amines, ammonium carbonate or ammonium bicarbonate are advantageously added to the reaction mixture.

Preferred silylating agents are amides of the Formula IIIa or IIIb, especially trimethylsilylacetamide, but above all halides of the Formula IX, such as trimethylchlorosilane and trimethoxychlorosilane.

The degree of silylation of the end product can be varied, as desired, depending on the amount of the silylating agent employed. The solubility of incompletely silylated polyamide-acids in the organic solvents mentioned below increases with increasing degree of silylation of the amide groups.

Thus it may be desirable, depending on the intended further processing, only to silylate a carboxyl proton in approximately every second to fifth polyamide-acid structural unit. The silylated polyamide-acid solutions thereby obtained display better solubility towards the corresponding nonsilylated solutions; additionally, both completely COO-silylated and partially COO-silylated polyamide-acids solutions are more resistant to cyclisation at room temperature than are corresponding solutions of nonsilylated polyamide-acids.

The reaction of the polyamide-acids having identical or different recurring structural units of the general Formula II with the silylating agents is appropriately carried out in an organic aprotic solvent which contains at least one hetero-atom and is inert towards the reactants, at temperatures between approx. 0° C. and 200° C., preferably between 10 and 100° C.

The silylating agent is used in at least a stoichiometric amount per carboxyl group to be silylated. When using silylating agents which are also capable of silylating amide protons, that is to say compounds of the Formulae IIIa to VIII, the silylating agent has to be used in a stoichiometric amount, whilst when using agents which are exclusively suitable for the silylation of carboxyl protons, that is to say compounds of the Formulae IX to XIV, it is preferred to work in a 1.5 to 20-mold excess of silylating agent.

As examples of suitable solvents there may be mentioned: N,N-dimethylacetamide, N,N-diethylacetamide, N,N - dimethylformamide, N,N - dimethylmethoxyacetamide, N-methyl-2-pyrrolidone, N-acetyl-2-pyrrolidone, N-methyl-ε-caprolactam, hexamethylphosphoric acid triamide (hexametapol), N,N,N'-N'-tetramethylurea, tetrahydrothiophene dioxide and dimethylsulphoxide. The reaction can also be carried out in mixtures of such solvents. These preferred solvent systems can however also be used diluted by the addition of other organic aprotic solvents, such as aromatic, cycoaliphatic or aliphatic, optionally chlorinated hydrocarbons, for example benzene, toluene, xylenes, cyclohexane, pentane, hexane, petroleum ether, methylene chloride, tetrahydrofurane, cyclohexanone and dioxane. However, when working in such mixtures the solvent ratio must be so chosen that the silylated polyamide-acid produced is not precipitated. Dimethylsulphoxide, N,N-dimethylacetamide, N,N-dimethylformamide and N-methylpyrrolidone are preferred as solvents.

If desired, these solvents can be removed in the usual manner after completion of the reaction, for example by stripping off, if appropriate under reduced pressure. Polymers silylated according to the invention can however also be precipitated in a manner which is in itself known by pouring the reaction solution into a precipitant, such as aliphatic hydrocarbons, especially petroleum ether, ethers of both functional groups of monoethylene glycol, diethylene glycol or triethylene glycol, or acetonitrile and the like, and can be dried if desired.

COO-Silylated polymers manufactured according to the invention are—in contrast to the corresponding non-silylated polyamide-acids—easily soluble in a large number of organic solvents or solvent mixtures, for example in mixtures of the abovementioned aprotic solvents, containing at least one hetero-atom, with optionally halogenated aromatic hydrocarbons, halogenated lower aliphatic hydrocarbons, cycloaliphatic hydrocarbons, aliphatic or cycloaliphatic ketones, cyclic ethers, amides of lower aliphatic carboxylic acids and alkyl esters of lower aliphatic carboxylic acids with 1 to 5 carobn atoms in the alkyl radical, such as benzene, toluene, xylene, chlorobenzene, dichlorobenzene, trichlorobenezne, tetrahydronaphthalene, chloroform, carbon tetrachloride, trichloroethylene and tetrachloroethylene, dichloroethane, trichloroethane and tetrachloroethane, methylene chloride, dichloromethane, acetone, methyl ethyl ketone, cyclopentanone, cyclohexanone, tetrahydrofurane, tetrahydropyrane, dioxane, ethyl acetate and butyl acetate.

Preferably, mixtures of chlorinated lower aliphatic hydrocarbons, especially methylene chloride, cycloaliphatic ketones, such as cyclohexanone or cyclic ethers, especially tetrahydrofurane, with N,N-dialkylamides of lower monocarboxylic acids, such as dimethylformamide and dimethylacetamide, dialkyl sulphoxides, such as dimethylsulphoxide, or cyclic amides, such as N-methylpyrrolidone, are used for the further processing of the silylated polyamide-acids.

Since polyamide-acids silylated according to the invention are soluble in the organic solvents or solvent mixtures mentioned, the poly-reaction can be carried out in highly concentrated solutions, for example in highly concentrated dimethylacetamide solution. This produces the possibility of subsequently diluting the solutions, for example with low-boiling solvents, such as benzene, toluene, xylenes, tetrahydrofurane, dioxane, cyclohexanone or methylene chloride, without the concentration of the resulting solutions becoming too low for further processing. These solutions are of relatively low viscosity and are therefore, for example, well suited to lamination purposes.

Solutions of polyamide-acids silylated according to the invention have a lower viscosity than the corresponding solutions of non-silylated polyamide-acids. This effect can be utilised, for example, in order to lower, as desired, the high viscosities of even only slightly concentrated solutions of very high molecular polyamide-acids. On the other hand, this effect permits the production of relatively concentrated solutions of silylated polyamide-acids (solutions of between 20 and 30% strength, depending on the degree of polymerisation), which show good processability because of their low viscosity. This for example ensures, when laminating glass fibres or carbon fibres, that while the solutions possess sufficient flow, sufficient material can be applied in a single process step. The viscosity of solutions of nonsilylated polyamide-acids of comparable molecular weight distribution, on the other hand, is already so high at concentrations of about 15-20% that the solutions barely still.

COO-silylated polymers with identical or differing recurring structural units of the Formula I, which have been manufactured according to the invention, can be desilylated in a manner which is in itself known and thus converted into the corresponding polyamide-imides and polyimides, by cyclising them, with elimination of silanols, either dry or in solution, by heating them to temperatures of above 30° C., preferably 30 to approx. 260° C., for between a few seconds and several hours. Hydrogen atoms bonded to the amide nitrogen which may still be present after the heating process and are capable of imide formation can be split off thermally or chemically, for example by treatment with acetic anhydride, in a manner which is in itself known. If catalytic amounts of a base, such as diethylamine, triethylamine or pyridine, are added, the cyclisation already largely occurs at room temperature.

For this reason, when silylating polyamide-acids and wishing to avoid premature cyclisation, only such silylating reagents are used, if desired, which during the trans-silylation reaction with the polymers do not form any strongly basic nitrogen compounds, as is the case, for example, when using N,N-diethyl-trimethylsilylamine.

An improvement in the heat stability and resistance to hydrolysis can be achieved in certain cases by further heating the resulting polyamide-imides or polyimides to temperatures of about 300-350° C. for a short time.

The silanols which are produced during the conversion of the polymers containing the COO-silyl groups, manufactured according to the invention, into the corresponding polyamide-imides and polyimides, can be removed relatively easily in the usual manner, together with the solvent.

As a result of their good solubility in a large number of low-boiling solvents or solvent mixtures, the polymers containing COO-silyl groups manufactured according to the invention can be processed particularly easily and can therefore be used in a manner which is in itself known, but is technically simple, for the manufacture of industrial products, especially for the manufacture of films (sheets), fibres, fibre-reinforced composite materials, laminates, ply structures, castings, honeycomb core material, adhesives, foams, coating compositions or paper and the like.

Polymers containing COO-silyl groups which are soluble in organic solvents and have an inherent viscosity of 0.1 to 4, especially 0.9 to 2.5, and contain identical or different recurring structural units of the general Formula I, in which $n$ denotes the number 1 and what has been stated under Formula I applies to R, $X_1$ and B, can be used, especially in the form of solutions in a solvent which does not split off the silyl radicals, above all for the manufacture of fibres, especially of films and sheets, and also of coating compositions, especially heat-resistant wire enamels and ply structures, whilst polymers containing COO-silyl groups, which are soluble in organic solvents and have an inherent viscosity of 0.1 to 4, especially 0.9 to 2.5, and possess identical or different recurring structural units of the General Formula I, in which $n$ denotes the number 2 and what has been stated under Formula I applies to R, $X_1$, $X_2$ and B, usually in the form of solutions in a solvent which does not split off the silyl radicals, are particularly suitable for the manufacture of foams, coating compositions, such as heat-stable wire enamels, mouldings, especially films and sheets, and also adhesives, laminates, fibres or the matrix of fibre-reinforced composite materials. In these cases the polymers containing COO-silyl groups are converted in situ, after or during processing, into the corresponding polyamide-imides or polyimides in the manner described above.

Polymers containing COO-silyl groups manufactured according to the invention are preferably processed in the form of solutions in one of the solvents mentioned which does not split off the silyl radicals, such solutions being stable in particular at room temperature.

For the manufacture of films, sheets, fibres, fibre-reinforced composite materials, laminates, papers, foams, coating compositions, castings, adhesives and the like, the customary additives, such as pigments, fillers, electrical conductors, for example carbon black or metal particles, agents for increasing the abrasion resistance, lubricants or reinforcing fibres, for example carbon fibres, boron fibres or glass fibres, can be added to the polymers containing silyl groups before or after shaping. Foams are obtained, for example, by adding customary blowing agents and, optionally, fillers to the silylated polymers before working up, or blowing air, carbon dioxide, nitrogen or the like into the polymer mass or polymer solution. Ply structures which contain polymers can optionally be provided with covering layers which improve the surface properties, for example of phenolic resins, aluminium and the like, and are used, inter alia, in aircraft construction.

Polymers containing silyl groups which accord with the definition, preferably in the form of solutions, can also be used as coating compositions and adhesives and the like, optionally with the addition of pigments, such as titanium dioxide, customary fillers and foaming agents and the like, for coating and covering substrates of the most diverse kind in any desired shape, such as films, fibres, fibre fleeces, wires, grid-like structures, fabrics, foams and the like. As suitable substrates there may be mentioned: metals, such as copper, brass, aluminium, iron and steel; asbestos fibre and glass fibre materials; polymers, such as cellulose materials (cellulose esters or cellulose ethers, paper and like); perfluorocarbon polymers, such as polytetrafluoroethylene; polyolefines, polyesters, polyamides, polyimides, polyurethanes and the like.

A further advantage of the long-chain COO-silylated polyamide-acids obtainable according to the invention over the short-chain COO-silylated polyamide-acids which can be manufactured in accordance with the previously known process is their improved technological properties.

EXAMPLE 1

A solution of 20.02 g. of bis-(4-aminophenyl)-ether in 250 ml. of dimethylacetamide is first introduced into a cylindrical glass vessel of about 1 litre capacity. 21.81 g. of pure pyromellitic acid dianhydride are added to this solution in portions, under a nitrogen atmosphere and with constant stirring, whilst keeping the temperature of the reaction mixture at approx. 20° C. by means of a cooling bath. After stirring for two hours at 20° C., a highly viscous polyamide-acid solution (PAA solution) has formed, which has an inherent viscosity ($\eta_{\mathrm{inh.}}$) of 1.30 dl./g. at 0.5% strength in 3% strength lithium chloride-dimethylacetamide solution at 25° C. A molar amount (20.3 g.) of bis-trimethylsilylacetamide is added to the resulting polyamide-acid solution at room temperature. A polyamide-acid solution in which the two carboxyl protons are replaced by trimethylsilyl radicals is obtained.

The solution of the COO-silylated polyamide-acid obtained according to section 1 of the above example can be converted in a manner which is in itself known into films, whilst excluding atmospheric moisture or even without this measure if working rapidly, by casting the polyamide-acid solution on a glass plate and first freeing it largely of the solvent at about 85° C./1 mm. Hg, and subsequently heating the films for approx. two hours to 200-250° C./1 mm. Hg. In the course thereof, the secondary product (acetamide) originating from the silylating agent is expelled and practically quantitative intra-molecular cyclisation of the silylated polyamide-acid to the corresponding silicon-free polypyromellitimide takes place.

EXAMPLES 2–14

If in Example 1 dimethylformamide or N-methyl-pyrrolidone are used as the solvent instead of dimethylacetamide, whilst otherwise following the same procedure, and the 20.3 g. of bis-trimethylsilylacetamide are replaced by equivalent amounts of one of the silylating agents listed below, silylated polyamide-acids having similar properties are obtained:

Example
No.:     Silylating agent
2 ----- Bis-trimethylsilylformamide.
3 ----- N-methyl-N-trimethylsilylacetamide.
4 ----- Bis-trimethylsilylbenzamide.
5 ----- Tetrakis-(trimethylsilyl)-oxamide.
6 ----- Trimethylchlorosilane.
7 ----- Trimethoxychlorosilane.
8 ----- Triphenoxychlorosilane.
9 ----- N,N-bis-(trimethylsilyl)-aniline.
10 ----- N-trimethylsilylpyrrolidone.
11 ----- N,N'-diphenyl-N,N'-ditrimethylsilyl - urea.
12 ----- Trimethylsilylacetamide.
13 ----- N,N'-bis-trimethylsilylcarbodiimide.
14 ----- Imidazolyl-1-trimethylsilane.

If halides are used for the silylation, the reaction is advantageously carried out in the presence of triethylamine, pyridine or another HCl acceptor. The silylated polyamide-acids obtained are above all suitable for the manufacture of films, foams and coating compositions in accordance with processes which are in themselves known.

EXAMPLE 15

A solution of a polyamide-acid is prepared in accordance with Example 1, Section 1, and after completion of the reaction a solution of 0.34 g. of pyromellitic acid dianhydride in 15 ml. of dimethylacetamide is further added to the reaction mixture at 20° C., whilst stirring. Hereupon, the viscosity of the solution rapidly rises and reaches a value of $\eta_{inh.}$=2.9 dl./g. (0.5% strength in 3% strength lithium chloride-dimethylacetamide solution at 25° C.) after two hours' stirring. The solution obtained, which barely still flows, is then mixed with somewhat more than a two-fold molar amount (28 g.) of trimethylsilylacetamide, dissolved in 20 ml. of tetrahydrofurane or cyclohexanone, at 20° C., whilst stirring well. The silylation already starts during the mixing and is complete after a few minutes, as can be seen from the drop in the viscosity. Polyimide films can be manufactured from the silylated polyamide-acid solution as described in Example 1.

The above silylated polyamide-acid solution can also be used for the manufacture of wire enamel by dipping copper wire into the solution, allowing it to drain and then stoving it firstly for 2 hours at 100° C. and then for one hour at 190° C. This process is repeated once more, after which the wire enamel is further cured for 15 hours at 250° C.

EXAMPLE 16

A solution of a silylated polyamide-acid is manufactured in accordance with Section 1 of Example 1. On introduction into petroleum ether (boiling point about 150–250° C.) the silylated polyamide-acid precipitates as a rubbery mass which still contains traces of included solvent. In contrast to the non-silylated polyamide-acid, the silylated compound dissolves, for example, in mixtures of approx. 75 percent by volume of tetrahydrofurane, dioxane or cyclohexanone with approx. 25 percent by volume of dimethylacetamide or N-methylpyrrolidone. Appropriately concentrated, viscous solutions of the silylated polyamide-acid in these solvents (for example 20–40% strength solutions, depending on the degree of polymerisation) can be converted in a known manner, with exclusion of atmospheric moisture, into films which after stripping off the relatively low-boiling solvents are converted into polyimide films by heating for about two hours to 100 to 250° C./1–20 mm. Hg. Fibres can also be manufactured from the above silylated polyamide-acid solution by spinning the solution in a hot air tunnel at temperatures of between 200 and 250° C.

In the above example, the lower alkyl ethers of ethylene glycol, and of its oligomers, wherein both functional groups are etherified, can for example also be used instead of petroleum ether as the precipitant for the silylated polyamide-acid.

EXAMPLE 17

Analogously to Example 1, 6.219 g. of pyromellitic acid dianhydride are reacted with 5.706 g. of 4,4'-diaminodiphenylether in 120 ml. of dimethylacetamide and the product is subsequently silylated with 4.45 g. of bis-trimethylsilylacetamide. After adding a mixture of 5.7 g. of acetic anhydride and 2.2 ml. of pyridine (ratio of andride:pyridine=2:1), the cyclisation to the polyimide already starts at room temperature and can be accelerated by warming the reaction mixture to about 50° C. The silicon-free polyimide which precipitates can be isolated by filtration and can largely be freed of the solvent and the other reagents by washing with methanol and subsequently drying in vacuo.

EXAMPLE 18

6.219 g. of pyromellitic acid dianhydride are reacted with 5.706 g. of 4,4'-diaminodiphenyl-ether in 120 ml. of N-methylpyrrolidone, analogously to Example 1. Thereafter the carboxyl groups of the resulting polyamide-acid are silylated by adding somewhat more than the stoichiometric amount of trimethylsilylacetamide (7.0 g.) and the reaction mixture is precipitated in petroleum ether/tetrahydrofurane (10:1). The silylated polyamide-acid dissolves, for example, in mixtures of about 75 percent by volume of tetrahydrofurane, dioxane or cyclohexanone with about 25 percent by volume of dimethylformamide or dimethylsulphoxide. Viscous, clear solutions of the silylated polyamide-acid are obtained, which can be used in a manner which is in itself known for casting films.

EXAMPLES 19–29

If in Example 18, whilst otherwise using the same procedure, equivalent amounts of one of the silylating agents listed below are used instead of 7.0 g. of trimethylsilyl-acetamide for the silylation of the carboxyl groups, silylated polyamide-acids with similar properties are obtained:

Example No.: Silylating agent
19 ------ Trimethylchlorosilane.
20 ------ Trimethoxychlorosilane.
21 ------ Triethylchlorosilane.
22 ------ Triphenylchlorosilane.
23 ------ Triphenoxychlorosilane.
24 ------ N,N-bis-(trimethylsilyl)aniline.
25 ------ N-Trimethylsilylpyrrolidone.
26 ------ N,N'-diphenyl-N,N'-ditrimethylsilyl-urea.
27 ------ N-Trimethylsilyl-ε-caprolactam.
28 ------ N-Trimethoxysilyl-ε-caprolactam.
29 ------ N,N'-Bis-(trimethylsilylcarbodiimide.

If halides are used for the silylation of the carboxyl protons, the reaction is advantageously carried out in the presence of triethylamine or of another HCl acceptor. The above silylation agents can also be used in excess, if desired.

EXAMPLE 30

6.219 g. of pyromellitic acid dianhydride are reacted with 5.549 g. of 4,4'-diaminodiphenylmethane in 120 ml. of N-methylpyrrolidone analogously to Example 1. A highly viscous polyamide-acid solution is thereby produced ($\eta_{inh.}$=1.35 dl./g., 0.5% strength in 3% strength lithium chloride-N-methylpyrrolidone solution at 25° C.).

Addition of 5.68 g. of bis-trimethylsilylacetamide yields a COO-silylated polyamide-acid which after precipitation in acetonitrile or petroleum ether is soluble, for example, in mixtures of approx. 50 percent by volume of benzene, toluene, cyclohexanone or methylene chloride with approx. 50 percent by volume of dimethylformamide, dimethylacetamide, N-methylpyrrolidone or dimethylsulphoxide. In contrast to non-silylated polyamide-acid solutions, these solutions are stable for a prolonged period (approx. 6 months) at room temperature.

EXAMPLES 31–34

If in Example 30, Section 1, whilst otherwise following the same procedure, equivalent amounts of one of the diamines listed below are used instead of 5.549 g. of 4,4'-diaminodiphenylmethane, silylated polyamide-acids having similar properties are obtained:

| Example No.: | Diamine |
|---|---|
| 31 | Benzidine. |
| 32 | p-Phenylenediamine. |
| 33 | m-Phenylenediamine. |
| 34 | 4,4'-diaminodiphenylsulphone. |

EXAMPLE 35

9.021 g. of 3,3',4,4'-benzophenone-tetracarboxylic acid dianhydride are reacted with 5.706 g. of 4,4'-diaminodiphenylether in 120 ml. of N-methylpyrrolidone, analogously to Example 1. A highly viscous polyamide-acid solution is thereby produced ($\eta_{inh}$=1.2 dl./g., 5% strength in 3% strength lithium chloride-dimethylacetamide solution at 25° C.). Addition of 6.1 g. of bis-trimethylsilylacetamide yields a silylated polyamide-acid which has a distinctly lower viscosity than the non-silylated polyamide-acid. After precipitation in petroleum ether the silylated polyamide-acid is soluble, for example, in mixtures of approx. 75 percent by volume of tetrahydrofurane or cyclohexanone with approx. 25 percent by volume of dimethylacetamide or dimethylformamide. Such solutions of silylated polyamide-acids can be converted into films in the manner described in Example 1.

If, in the above example, the 120 ml. of N-methylpyrrolidone are replaced by equivalent amounts of dimethylacetamide or dimethylformamide or solvent mixtures which consist to the extent of up to one-third of benzene, toluene, xylene, tetrahydrofurane, dioxane or cyclohexanone, the remainder being dimethylacetamide or dimethylformamide, silylated polyamide-acids having similar properties are obtained.

EXAMPLE 36

5.894 g. of 4-chloroformyl-phthalic anhydride are added to a solution of 5.706 g. of 4,4'-diaminodiphenylether in 50 ml. of dry dimethylacetamide, whilst stirring and excluding moisture and at the same time cooling with an ice bath. When the anhydride has completely dissolved, the ice bath is removed and the reaction mixture is stirred for a further 3 hours at room temperature. 3.4 g. of trimethylsilylacetamide are then added to the resulting viscous reaction solution (inherent viscosity of the polymer=1.6 dl./g., 0.5% strength in 3% strength lithium chloride-dimethylacetamide solution at 25° C.). After driving off the solvent and the other reactants, the resulting silylated polyamide-acid amide can be converted into the corresponding polyamide-imide by heating to 150–250° C. for one hour.

The solution of the silylated polyamide-acid amide in dimethylacetamide can also first be precipitated in petroleum ether. The polyamide-acid amide which has precipitated dissolves, for example in a 70:30 mixture of cyclohexanone and dimethylformamide. Conversion of these solutions, for example into films, laminates or wire enamels, after removal of the solvent and heating for about one hour to 150–250° C. yields the silicon-free polyamide-imide.

EXAMPLE 37

A solution of 5.7 g. of 4,4'-diaminodiphenyl-ether in 10 ml. of N-methylpyrrolidone is added to a solution of 6.2 g. of pyromellitic acid dianhydride in a mixture of 10 ml. of N-methylpyrrolidone and 5 ml. of toluene whilst stirring and cooling to 10–20° C. The resulting highly viscous reaction mixture is then stirred for about 1 hour at room temperature, after which 7.8 g. of trimethylsilylacetamide are added. This results in a lowering of the viscosity. The reaction solution thus obtained still possesses good flow and is easily processable.

EXAMPLE 38

If in Example 1, whilst otherwise following the same procedure, only ¼ or ⅛ of the stoichiometric amount of bis-trimethylsilylacetamide (5.1 g. or 2.56 g.) is used, silylated polyamide-acids are obtained in which, on average, only one carboxyl group in every second to fourth structural unit is silylated. These only partially silylated polyamide-acids can also be converted in a manner which is in itself known, as described in Example 1, into silicon-free sheets or films. The resulting partially silylated polyamide-acids are soluble, for example, in mixtures of approx. 60 percent by volume of tetrahydrofurane, dioxane or cyclohexanone and approx. 40 percent by volume of dimethylformamide, dimethylacetamide, N-methylpyrrolidone or dimethylsulphoxide, and can be converted in the usual manner, for example into sheets.

EXAMPLES 39–44

If, in Example 38, the 5.1 or 2.56 g. of bis-trimethylsilylacetamide are replaced by equivalent amounts of one of the silylating agents listed below, partially silylated polyamide-acids having similar properties are obtained:

| Example No.: | Silylating agent |
|---|---|
| 39 | Trimethylsilylacetamide. |
| 40 | N-trimethylsilyl-ε-caprolactam. |
| 41 | N,N'-diphenyl-N-trimethylsilyl-urea. |
| 42 | Hexamethyldisilizane. |
| 43 | Trimethylchlorosilane. |
| 44 | Trimethoxychlorosilane. |

If halides are used as silylating agents, the reaction is advantageously carried out in the presence of triethylamine or of another HCl-acceptor.

We claim:

1. Process for making a polymer which contains COO-silyl groups, is soluble in organic solvents, has an inherent viscosity at a concentration of 0.5 percent by weight in N,N-dimethylformamide, N,N-dimethylacetamide or N-methyl-pyrrolidone, measured at 25° C., of 0.1 to 4.0 dl./g., said polymer having a recurring structural unit of Formula I

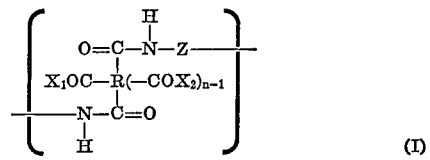

(I)

in which R represents a radical which possesses at least one 5-membered or 6-membered cycloaliphatic, carbocyclic-aromatic or heterocyclic ring, with the carbonyl groups being directly bonded to different ring carbon atoms, $X_1$ and $X_2$ represent a group of the formula

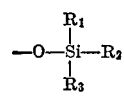

or hydroxyl, with $R_1$, $R_2$ and $R_3$ independently of one another each denoting an alkyl of 1 to 12 carbon atoms, a cycloalkyl, aryl, aralkyl, lower alkoxy or aryloxy radical and the radicals —$COX_1$ and —$COX_2$ are each located on a ring carbon atom adjacent to the carbonamide group, $n$ denotes the number of 1 or 2 and Z denotes a divalent carbocyclic-aromatic or heterocyclic-aromatic radical, an aliphatic radical with at least 2 carbon atoms, a cycloaliphatic radical or an araliphatic radical, or the corresponding partially cyclised imide, with at least one structural unit of Formula I containing a

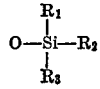

group, characterised in that a polyamide-acid having the recurring structural unit of Formula II

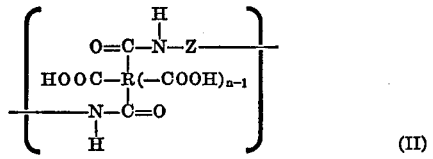

(II)

wherein R, Z and $n$ is defined under Formula I and the COOH radicals are located on a ring carbon atom adjacent to the carbonamide group, or the corresponding partially cyclised imide, is reacted, at a temperature of from about 0° C. to 200° C., with at least a stoichiometric amount, per carboxyl group to be silylated, of a silylating agent introducing radicals of the formula

into the carboxyl groups, selected from the group consisting of an amide Formula IIIa and IIIb

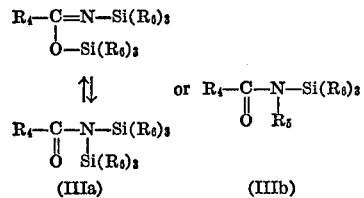

(IIIa)   (IIIb)

in which $R_4$ denotes hydrogen, trifluoromethyl, lower alkyl, a cycloalkyl, aryl or aralkyl radical, $R_5$ denotes hydrogen, lower alkyl, a cycloalkyl, aryl or aralkyl radical and $R_6$ each independently of one another denote a lower alkyl, a cycloalkyl, aryl or aralkyl radical;
an amine of Formula IV

(IV)

in which $R_6$, each independently of one another denote lower alkyl, lower alkoxy, a cycloalkyl, aryl, aralkyl or phenoxy radical and $R_7$ and $R_8$ independently of one another denote hydrogen, lower alkyl, a cycloalkyl, aryl or aralkyl radical or a $(R_6)_3$—Si radical;
a diamine of Formula V

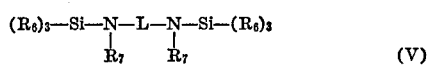

(V)

in which $R_6$ and $R_7$ have the meanings indicated under Formulae IIIa, IIIb and IV, and L is phenylene or alkylene with 2 to 10 carbon atoms;
a hydroxylamine of Formula VI

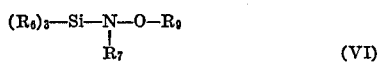

(VI)

in which $R_6$ and $R_7$ have the meanings given under Formulae IIIa, IIIb and IV, and $R_9$ represents lower alkyl, a cycloalkyl, aryl or aralkyl radical or a —Si(R)$_3$ radical;

a compound of the General Formulae VII

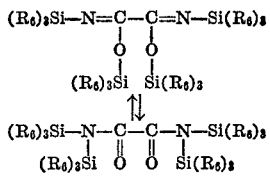

(VII)

in which $R_6$ has the meaning indicated under Formula IIIa or IIIb;
a compound of Formula VIII

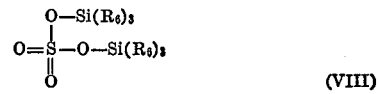

(VIII)

in which $R_6$ has the meaning indicated under Formulae IIIa or IIIb;
a halide of Formula IX $(R_{6''})_3$—Si—Hal        (IX)

in which $R_{6''}$ denotes an alkyl group with up to 12 carbon atoms, a cycloalkyl, aryl, aralkyl or aryloxy group or lower alkoxy, and Hal denotes fluorine, chlorine or bromine;
a urea of the General Formula X

(X)

in which $R_6$, $R_7$ and $R_8$ have the meanings given above;
an imidazole and 1,2,4-triazole of Formulae XI and XII

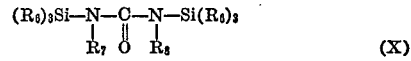

(XI)        (XII)

in which $R_6$ has the meaning indicated under Formula IIIa or IIIb;
a lactam of Formula XIII

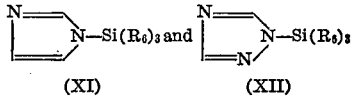

(XIII)

in which $R_{6'}$ has the meaning indicated under Formula IV and $R_{10}$ represents alkylene of 3 to 12 carbon atoms or an arylene radical; and
a cyclic amine of Formula XIV

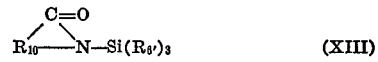

(XIV)

in which $R_6$ has the meaning indicated under Formula IIIa or IIIb and $R_{11}$ represents alkylene of 2 to 12 carbon atoms which may contain —O or —S atoms, or represents a fused arylene radical.

2. Process according to claim 1, characterized in that trimethylchlorosilane, trimethoxychlorosilane, trimethoxychlorosilane or trimethylsilylacetamide are used as silylating agents.

3. Process according to claim 1, characterized in that a polyamide-acid having the recurring structural unit of the General Formula II is used, in which R denotes the benzene ring or the benzophenone ring system, $n$ denotes the number 2 and Z denotes a benzene ring or a 4,4'-diphenyl-ether, 4,4'-diphenylsulphone or 4,4'-diphenyl radical.

4. Process according to claim 1, characterized in that a polyamide-acid having the recurring structural unit of the General Formula II is used, in which R denotes the benzene ring or the benzophenone ring system, $n$ denotes the number 2 and Z denotes a 4,4'-diphenyl-ether radical.

5. Process according to claim 1, characterized in that a polyamide-acid having the recurring structural unit of the General Formula II is used, in which R denotes the benzene ring, $n$ denotes the number 1 and Z denotes a benzene ring or a 4,4'-diphenyl-ether, 4,4'-diphenylsulphone or 4,4'-diphenyl radical.

6. Process according to claim 1, characterised in that a polyamide-acid having the recurring structural unit of the General Formula II is used, in which R denotes the benzene ring, n denotes the number 1 and Z denotes a 4,4'-diphenyl-ether radical.

References Cited

UNITED STATES PATENTS

| | | | |
|---|---|---|---|
| 3,303,157 | 2/1967 | Boldebuck et al. | 260—30.4 |
| 3,392,144 | 7/1968 | Holub | 260—46.5 |
| 3,440,204 | 4/1969 | Reinhard | 260—33.4 |
| 3,553,282 | 1/1971 | Holub | 260—824 |
| 3,598,785 | 8/1971 | Holub et al. | 260—46.5 |
| 3,663,728 | 5/1972 | Hoback et al. | 260—29.2 N |
| 3,673,155 | 6/1972 | Holub et al. | 260—65 |

LESTER L. LEE, Primary Examiner

U.S. Cl. X.R.

260—46.5 E, 65, 78 TF